(12) United States Patent
Angel et al.

(10) Patent No.: US 11,879,530 B2
(45) Date of Patent: Jan. 23, 2024

(54) TORQUE CONVERTER ANTI-CONTAMINATION PLATE

(71) Applicant: Schaeffler Technologies AG & Co. KG, Herzogenaurach (DE)

(72) Inventors: Scott Angel, Marshallville, OH (US); Daniel Linton, North Canton, OH (US); Timothy Simon, Wooster, OH (US); Melissa Blischak, Copley, OH (US); Brian Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 2 days.

(21) Appl. No.: 17/565,886

(22) Filed: Dec. 30, 2021

(65) Prior Publication Data

US 2023/0213090 A1    Jul. 6, 2023

(51) Int. Cl.
*F16H 41/24*    (2006.01)

(52) U.S. Cl.
CPC .................... *F16H 41/24* (2013.01)

(58) Field of Classification Search
CPC ...................................... F16H 41/24
See application file for complete search history.

(56) References Cited

U.S. PATENT DOCUMENTS

| 9,615,858 | B2 | 4/2017 | Doubler et al. | |
| 2011/0120829 | A1* | 5/2011 | Vanni | F16H 45/02 403/34 |
| 2012/0073926 | A1* | 3/2012 | Lindemann | F16H 45/02 192/3.29 |
| 2014/0356137 | A1* | 12/2014 | Zaugg | F16H 41/24 415/146 |
| 2015/0152949 | A1* | 6/2015 | Avins | F16H 41/24 403/14 |
| 2015/0323052 | A1* | 11/2015 | Moore | F16H 41/24 60/364 |
| 2019/0136950 | A1* | 5/2019 | Welch | F16H 41/28 |

* cited by examiner

*Primary Examiner* — Lori Wu
(74) *Attorney, Agent, or Firm* — Volpe Koenig

(57) ABSTRACT

A torque converter centering sleeve assembly is disclosed herein that includes an anti-contamination plate. The assembly includes a centering sleeve including a body. A plate, i.e. an anti-contamination plate, is arranged inside of the centering sleeve. The plate includes at least a first portion and a second portion in contact with an inner surface of the centering sleeve such that the plate partitions off a pocket defined by the centering sleeve. The plate can be secured to the centering sleeve via a snap fit or press fit.

20 Claims, 4 Drawing Sheets

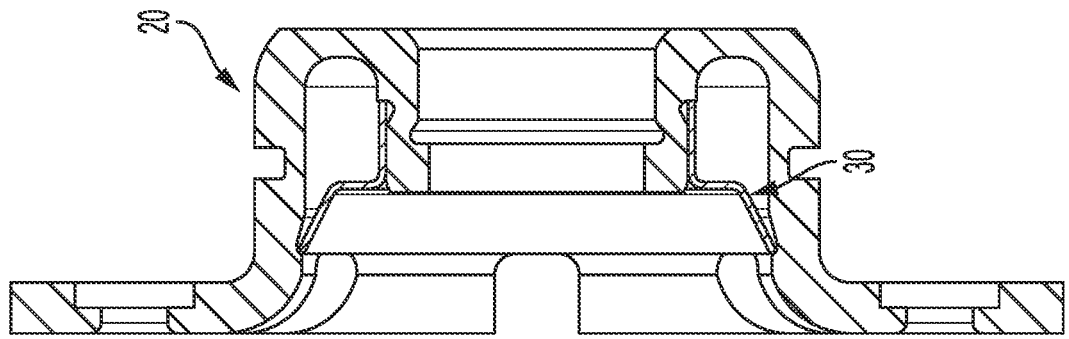
FIG. 4B
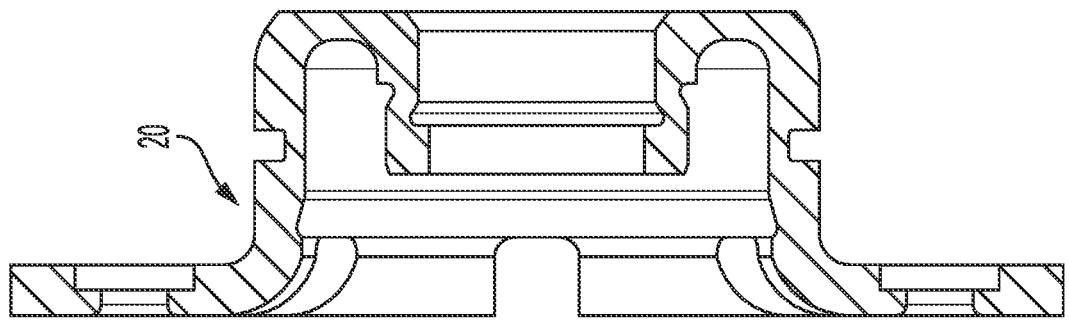
FIG. 4A
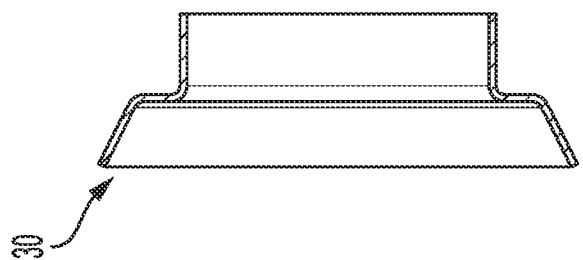

TORQUE CONVERTER ANTI-CONTAMINATION PLATE

FIELD OF INVENTION

The present disclosure is directed to a torque converter, and is more particularly related to an aspect of a centering sleeve for a torque converter.

BACKGROUND

Torque converter assemblies are well known. Within these assemblies, various components are used in order to provide thrust surfaces, bearing surfaces, and other support surfaces. Centering sleeves are known components of torque converter assemblies. Centering sleeves can be formed according to a variety of profiles, shapes, and dimensions. One type of centering sleeve is formed by stamping, which as a result, can include various pockets or folded flange portions. These regions are prone to collecting or trapping chips during machining or other manufacturing steps. These chips, which are also generally referred to as contaminates, are prone to later becoming loose and falling out of the centering sleeve, thereby causing premature failure of the torque converter assembly.

Accordingly, there is a need to address issues caused by stamped centering sleeves, and particularly with addressing the issue of contaminates becoming trapped by centering sleeves.

SUMMARY

A torque converter centering sleeve assembly is disclosed herein. The assembly includes a centering sleeve including a body. A plate is arranged inside of the centering sleeve. The plate includes at least a first portion and a second portion in contact with an inner surface of the centering sleeve such that the plate partitions off a pocket defined by the centering sleeve. The plate can be secured to the centering sleeve via a snap fit or press fit.

The plate is formed from stamping in one aspect. The first portion is arranged at an angle in a radially outward direction, in one aspect.

The body of the centering sleeve can include a first groove dimensioned to receive the first portion. The second portion of the plate is configured to engage the centering sleeve with a press-fit. The second portion has a flat profile, in one aspect.

The body of the centering sleeve includes a second groove dimensioned to receive the second portion of the plate. The body of the centering sleeve includes a first groove dimensioned to receive the first portion, and the body of the centering sleeve includes a second groove dimensioned to receive the second portion. The second groove can consist of a recessed portion and an axial end stop portion that prevents the plate from being axially pushed beyond a predetermined limit.

The first and second grooves are defined on a common surface of the body of the centering sleeve, in one aspect. The first groove faces a radially inward direction and the second groove faces a radially outward direction, in one aspect. The body of the centering sleeve can include a bent flange having a U-shaped profile. The bent flange can define the pocket of the centering sleeve.

The first portion and the second portion of the plate are axially offset from each other, in one aspect. The first portion of the plate can have a conical profile, and the second portion of the plate can have a cylindrical profile. A third portion of the plate can be provided that connects the first portion and the second portion, and the third portion extends in a radial direction.

A method of assembling a centering sleeve assembly is also disclosed herein. The method includes forming a centering sleeve via stamping. The centering sleeve includes at least a first groove and a second groove. The method includes bending a portion of the centering sleeve to form a pocket. The method includes inserting a plate into contact with at least the first groove and the second groove of the centering sleeve.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 4A is a cross-sectional view of a centering sleeve and a plate in the disassembled state.

FIG. 4B is a cross-sectional view of a centering sleeve and a plate in the assembled state.

DETAILED DESCRIPTION OF THE PREFERRED EMBODIMENTS

Figure 1:
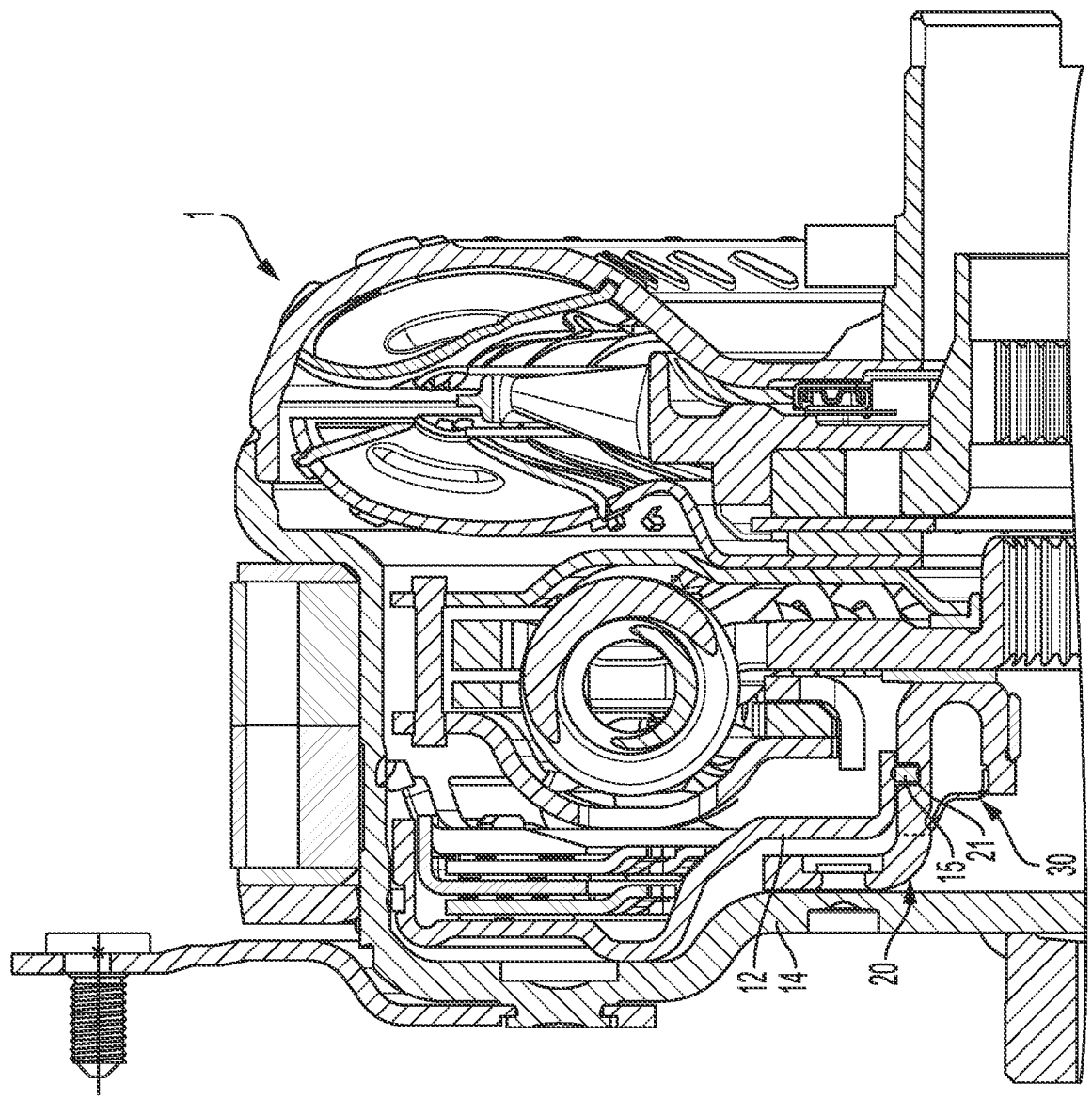
FIG. 1 is a side cross-sectional view of a torque converter assembly according to one aspect.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A torque converter assembly 1 is shown in FIG. 1. The torque converter assembly 1 generally includes a centering sleeve 20 and a plate 30, which form a torque converter centering sleeve assembly 10. As shown in FIG. 1, a seal 15 can be arranged on a radially outer surface of the centering sleeve 20. In one aspect, the seal 15 can be arranged within a groove 21 formed on the centering sleeve 20. The seal 15 can be arranged between a piston 12 and the centering sleeve 20, in one embodiment. The centering sleeve 20 can also be attached to a front cover 14 at one end. In one aspect, the end of the centering sleeve 20 fixed to the front cover 14 is opposite from an end of the centering sleeve 20 that secures the plate 30.

Figure 2B:
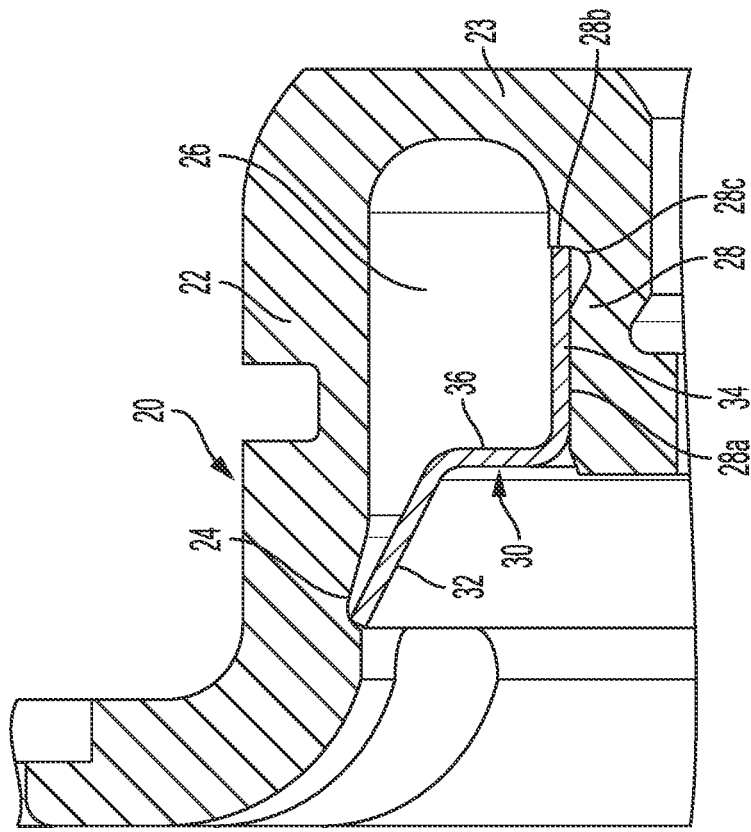
FIG. 2B is a further magnified cross-sectional view of another centering sleeve and a plate in the assembled state.
Figure 2A:
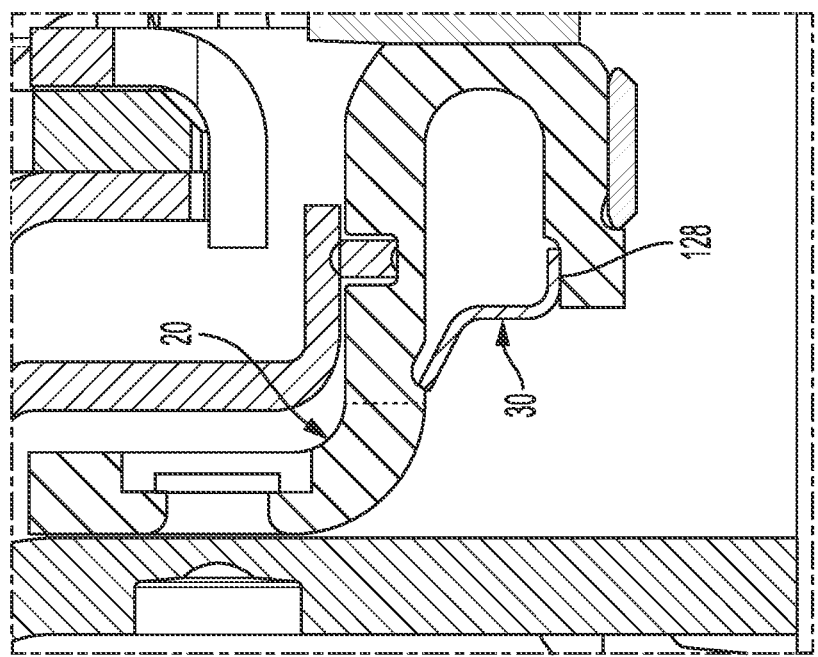
FIG. 2A is a magnified cross-sectional view of a centering sleeve and a plate of the torque converter assembly in an assembled state.
Figure 3:
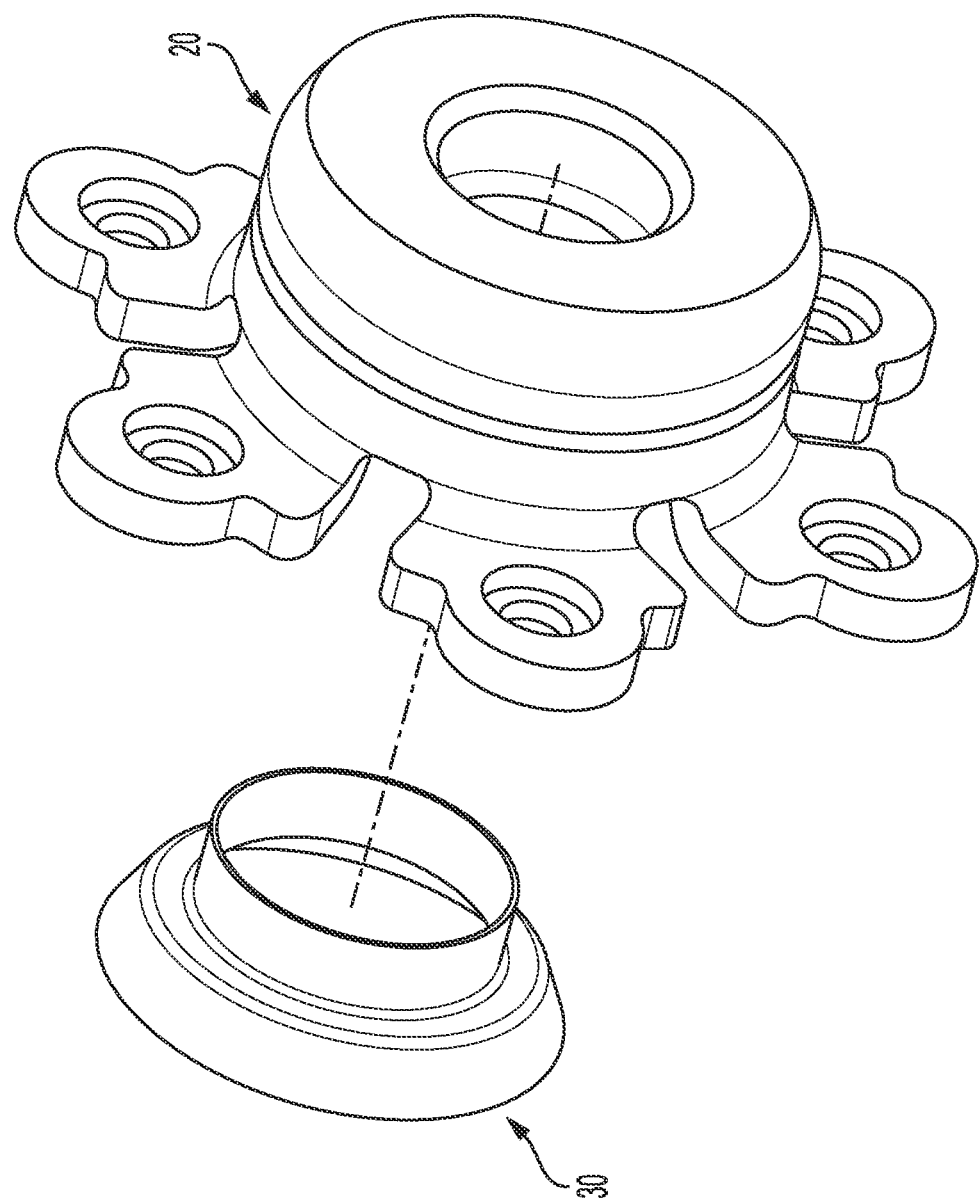
FIG. 3 is a perspective view of a centering sleeve and a plate in a disassembled state.

The plate 30 is secured to the centering sleeve 20 via a snap fit or press fit using the features disclosed herein. The connection between the plate 30 and the centering sleeve 20 is best shown in FIGS. 2A, 2B, and 4B. Disassembled states of the plate 30 and the centering sleeve 20 are shown in FIGS. 3 and 4A. The plate 30 is considered an anti-contamination plate due to its function in preventing debris, such as chips, from entering regions of the centering sleeve 20, as described in more detail herein.

The centering sleeve 20 generally includes a body 22. The body 22 can be formed via stamping, according to one aspect. The centering sleeve 20 can generally be provided to define an axial abutment or engagement surface for a torque converter cover and a damper flange. The centering sleeve 20 can include connection regions, such as openings or holes, configured to receive fasteners to connect the centering sleeve 20 to the torque converter cover or any other torque converter component.

The plate 30 is generally arranged inside of the centering sleeve 20. In one aspect, the plate 30 is formed as a stamped component. The plate 30 can be formed from sheet metal, in one aspect. A thickness of the plate 30 can be less than a thickness of the centering sleeve 20. The plate 30 includes at least a first portion 32 and a second portion 34 in contact with an inner surface of the centering sleeve 20. The plate 30 is configured to partition off a pocket 26 defined by the centering sleeve 20. As used in this context, the term partition means to seal or block an area defined by the pocket 26.

The shape of the plate 30 can vary. In one aspect, the first portion 32 is arranged at an angle in a radially outward direction. In other words, the first portion 32 can be tapered radially outward and have a conical profile. The second portion 34 has a flat profile, in one aspect, and can be formed as a cylindrical shape. The first portion 32 and the second portion 34 can be axially offset from each other. A third portion 36 of the plate 30 can connect the first portion 32 and the second portion 34. The third portion 36 can extend in a radial direction.

Mating features can be formed on the centering sleeve 20 in order to allow for engagement and receiving the first and second portions 32, 34 of the plate 30. For example, the body 22 of the centering sleeve 20 can include a first groove 24 dimensioned to receive the first portion 32. The body 22 of the centering sleeve 20 can also include a second groove 28 dimensioned to receive the second portion 34.

The second groove 28 can include multiple regions or aspects. For example, as shown in FIG. 2A, the second groove 128 can include a reduced outer diameter or thinned portion relative to a remainder of the centering sleeve 20.

As shown in FIG. 2B, the second groove 28 can include a region 28a having a reduced outer diameter on an axial end of the body 22 relative to a remainder of the body 22. In one aspect, the region 28 is formed as an undercut or recessed surface. The second groove 28 can further include an axial end face 28b that is configured to define an end stop or axial limiting feature for the plate 30. During assembly, the axial end face 28b of the groove 28 functions as a limiting feature such that the plate 30 cannot be pressed axially beyond the axial end face 28b. A depth of the recessed surface region 28a is sufficient such that the end of the plate 30 axially slides into engagement with the axial end face 28b of the second groove 28. A third region 28c can also be provided for the second groove 28 having a deeper recess than the first region 28a and that defines a connection region between the first region 28a and the second region 28b. One of ordinary skill in the art would understand that the exact shape of the second groove 28 can vary.

In one aspect, the second portion 34 is configured to engage the centering sleeve 20 with a press-fit. The first portion 32 can be configured to snap into contact with the first groove 24 on the centering sleeve 20.

In one aspect, the first and second grooves 24, 28 are defined on a common surface of the body 22 of the centering sleeve 20. This common surface can be defined on a bent flange 23. The first groove 24 can be configured to face a radially inward direction and the second groove 28 can be configured to face a radially outward direction. Although the term groove is used to define both elements 24 and 28, the profile, geometry, and characteristics of the grooves are not identical. Additionally, the second groove 28, 128 can have a varying geometry from one aspect or embodiment to another, as shown between FIGS. 2A and 2B.

The bent flange 23 can be formed with a U-shaped profile. The bent flange 23 defines the pocket 26 of the centering sleeve 20. Although the pocket 26 is illustrated as having one profile in the drawings, one of ordinary skill in the art would understand that the size, shape, profile, and dimensions of the pocket 26 can vary.

The plate 30 described herein can generally be used to prevent debris from getting caught or trapped in the pocket 26 of the centering sleeve 20. Debris, such as machining chips, can be generated during manufacturing of the centering sleeve 20. The plate 30 is generally configured to prevent chips from getting trapped within the pocket 26 of the centering sleeve 20 during machining, washing, manufacturing, or other steps associated with forming the centering sleeve 20. Therefore, the plate 30 acts as an anti-contamination feature by preventing debris, chips, or other contaminating matter from entering a specific region of the centering sleeve 20 during manufacturing.

A method of assembling a centering sleeve assembly is also disclosed herein. The method includes forming a centering sleeve 20 via stamping. The method includes bending a portion of the centering sleeve 20 to form a pocket 26. The method further includes inserting a plate 30 into contact with at least a first groove 24 and a second groove 28 of the centering sleeve 20. One of ordinary skill in the art would understand that various other assembly or formation steps can be provided.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS torque converter assembly 1
torque converter centering sleeve assembly 10
piston 12
front cover 14
seal 15
centering sleeve 20
groove 21
body 22 flange 23
first groove 24
pocket 26
second groove 28, 128
first region 28a of second groove
second region 28b of second groove
third region 28c of second groove
plate 30
first portion 32
second portion 34

What is claimed is:

1. A torque converter centering sleeve assembly comprising:
   a centering sleeve including a body;
   a plate arranged inside of the centering sleeve, the plate including at least a first portion and a second portion in contact with an inner surface of the centering sleeve, such that the plate partitions off a pocket defined by the centering sleeve;
   wherein the body of the centering sleeve includes a groove dimensioned to receive the second portion.

2. The assembly according to claim 1, wherein the plate is formed from stamping.

3. The assembly according to claim 1, wherein the first portion is arranged at an angle in a radially outward direction.

4. The assembly according to claim 3, wherein the body of the centering sleeve includes a further groove dimensioned to receive the first portion.

5. The assembly according to claim 1, wherein the second portion is configured to engage the centering sleeve with a press-fit.

6. The assembly according to claim 1, wherein the second portion has a flat profile.

7. The assembly according to claim 1, wherein the body of the centering sleeve includes a further groove dimensioned to receive the first portion.

8. The assembly according to claim 7, wherein the groove and the further groove are defined on a common surface of the body of the centering sleeve.

9. The assembly according to claim 7, wherein the further groove is facing a radially inward direction and the groove is facing a radially outward direction.

10. The assembly according to claim 1, wherein the body of the centering sleeve includes a bent flange having a U-shaped profile.

11. The assembly according to claim 10, wherein the bent flange defines the pocket of the centering sleeve.

12. The assembly according to claim 1, wherein the groove includes a first region defined on an axial end of the body having a recessed surface and a second region located axially inward from the first region and defining an axial end stop for a portion of the plate.

13. The assembly according to claim 1, wherein the first portion has a conical profile, and the second portion has a cylindrical profile.

14. The assembly according to claim 13, wherein a third portion of the plate connects the first portion and the second portion, and the third portion extends in a radial direction.

15. The assembly according to claim 1, wherein the plate is secured to the centering sleeve via a snap fit or press fit.

16. A method of assembling a centering sleeve assembly, the method comprising:
   forming a centering sleeve via stamping, wherein the centering sleeve includes at least a first groove and a second groove;
   bending a portion of the centering sleeve to form a pocket; and
   inserting a plate into contact with at least the first groove and the second groove of the centering sleeve, wherein the plate partitions off the pocket.

17. The method according to claim 16, wherein the plate includes at least a first portion in contact with the first groove, and a second portion in contact with the second groove.

18. The method according to claim 17, wherein the first portion is formed as a tapered conical section and the second portion is formed as a cylindrical section.

19. The method according to claim 17, wherein the second groove includes a first region defined on an axial end of the centering sleeve having a recessed surface and a second region located axially inward from the first region that defines an axial end stop for a portion of the plate.

20. A torque converter centering sleeve assembly comprising:
   a centering sleeve including a body, the body including a bent flange having a U-shaped profile;
   a plate arranged inside of the centering sleeve, the plate including at least a first portion and a second portion in contact with an inner surface of the centering sleeve, such that the plate partitions off a pocket defined by the bent flange.

* * * * *